United States Patent

Izumi et al.

[11] 4,051,332
[45] Sept. 27, 1977

[54] MULTIPLEX DIGITAL ECHO SUPPRESSION SYSTEM

[75] Inventors: Kazuo Izumi; Kazuto Izumi, both of Yokohama, Japan

[73] Assignee: Nippon Telegraph and Telephone Public Corporation, Tokyo, Japan

[21] Appl. No.: 661,381

[22] Filed: Feb. 25, 1976

Related U.S. Application Data

[63] Continuation-in-part of Ser. No. 495,885, Aug. 8, 1974, abandoned.

[30] Foreign Application Priority Data

Aug. 20, 1973 Japan .................................. 48-92371

[51] Int. Cl.² .................................................. H04B 3/20
[52] U.S. Cl. ................................ 179/170.2; 179/170.6
[58] Field of Search ................. 179/170.2, 170.6, 170.8

[56] References Cited

U.S. PATENT DOCUMENTS

| | | | |
|---|---|---|---|
| 3,562,448 | 2/1971 | May, Jr. ............... | 179/170.6 |
| 3,673,355 | 6/1972 | La Marche et al. .............. | 179/170.6 |
| 3,823,275 | 7/1974 | La Marche et al. .............. | 179/170.6 |
| 3,937,907 | 2/1976 | Campanella et al. ............. | 179/170.2 |

*Primary Examiner*—Kathleen H. Claffy
*Assistant Examiner*—Randall P. Myers
*Attorney, Agent, or Firm*—Burgess, Ryan and Wayne

[57] ABSTRACT

The invention discloses a multiplex digital echo suppression system in which on each of the transmitting and receiving sides the PCM signal for each channel is converted into the parallel signal and also into the absolute value signal representing the absolute value of the PCM signal by eliminating the sign bit; thus converted signals are accumulated for a predetermined time in a transmitting-side and receiving side accumulators and then compared in a comparator so that the output is derived from the comparator when the accumulated signal in the transmitting-side accumulator is higher in level than the signal accumulated in the receiving-side accumulator; in response to the output signal from the comparator, a first timer is set to a first predetermined time during which the signal is derived from the first timer; when the signal level in the receiving-side accumulator is higher than a predetermined level of a threshold level comparator, the output is derived therefrom and applied to a second timer which in turn is set to a second predetermined time shorter than the time of the first timer, the output signal being derived from the second timer during said second predetermined time. The output from the first timer is applied to a receiving-side logic circuit which in turn controls an attenuator while the outputs from the first and second timers are applied to a transmitting-side logic circuit which controls an echo switch by the logical combination of said output signals.

5 Claims, 12 Drawing Figures

MULTIPLEX DIGITAL ECHO SUPPRESSION SYSTEM

This application is a continuation-in-part of prior U.S. application Ser. No. 495,885, filed Aug. 8, 1974, now abandond, and assigned to the Assignee of the instant application.

BACKGROUND OF THE INVENTION

The present invention relates to a multiplex digital echo suppression system for suppressing echoes produced in the channels of the satellite communications system and the marine cable communications system without deciding the multiplexed digitally coded signals into the voice signals.

In the satellite communications system, there has been a problem that the speaker cannot clearly hear the receiver voice because the echo of the speaker's voice is included in receiver's voice. In the conventional analog echo suppression systems devised and developed for overcoming this problem, one analog echo suppressor must be provided for each channel, is large in size and consumes much energy. Therefore there arise the problems of tremendous initial cost and large installation space because one echo suppressor must be provided for each of thousands telephone channels in each earth station in the domestic satellite communications system.

There has been also devised and demonstrated a digital type echo suppression system in which the analog signal is converted into the digital signal by an analog-to-digital converter. But this system also has an inherent defect that one echo suppressor must be provided for each channel. There has been also devised and demonstrated a multiplex digital echo suppression of the type in which the complex logical operations of the digital signal are carried out in order to detect the peak value of the digital signal, but the circuit configurations are much too complex for practical purposes.

SUMMARY OF THE INVENTION

In view of the above, one of the objects of the present invention is to provide a multiplex digital echo suppression system in which the PCM signal is processed in a digital manner without being converted into the analog audio signal in order to suppress the echo.

Another object of the present invention is to provide a multiplex digital echo suppression system in which the echos in the multiplexed PCM signals may be suppressed on a time-sharing basis by a single echo suppression system.

To the above and other ends, briefly stated the present invention provides a multiplex digital echo suppression system comprising a transmitting-side absolute value converter and a receiving-side absolute value converter, each for converting the transmitting-side or receiving side PCM signal for each channel into the parallel PCM signal in which the sign bit is eliminated for representing the absolute value of the transmitting or receiving-side PCM signal; a transmitting-side accumulator and a receiving-side accumulator each for accumulating the output signal from the corresponding absolute value converter for a predetermined time; first comparator means for comparing the output for each channel derived from the transmitting-side accumulator in synchronism with the transmitting-side PCM signal, with the output signal for the corresponding channel derived from the receiving-side accumulator in synchronism with the receiving-side PCM signal when the comparison signal which is synchronous with the transmitting-side PCM signal occurs is higher in level than that from the receiving-side accumulator; first timer means which is set for a first predetermined time in response to the output signal from the first comparator means and keeps generating the output signal during the first predetermined time; second threshold level comparator means for comparing a predetermined threshold level with the output for each channel derived from the receiving-side accumulator and generating the output signal when the output from the receiving-side accumulator is higher in level than the predetermined threshold level; second timer means which is set for a second predetermined time shorter than the first predetermined time of the first timer means in response to the output signal from the second comparator means and keeps generating the output signal during the second predetermined time; receiving-side logic circuit means including attenuator means and arranged in such a way that in response to the output for a certain channel from said first timer means the attenuator means may be activated, thereby attenuating the receiving-side input PCM signal in the certain channel; and transmitting-side logic circuit means including echo switching means and arranged in such a way that in response to the outputs for a certain channel derived from the output signal combination of the first and second timer means the transmitting-side logic circuit means carries out a predetermined sequence of logical operations to determine whether the echo switching means is opened or closed for said certain channel.

BRIEF DESCRIPTION OF THE DRAWING

Same reference numerals are used to designate similar parts throughout the figures.

DESCRIPTION OF THE PREFERRED EMBODIMENT

Figure 1:
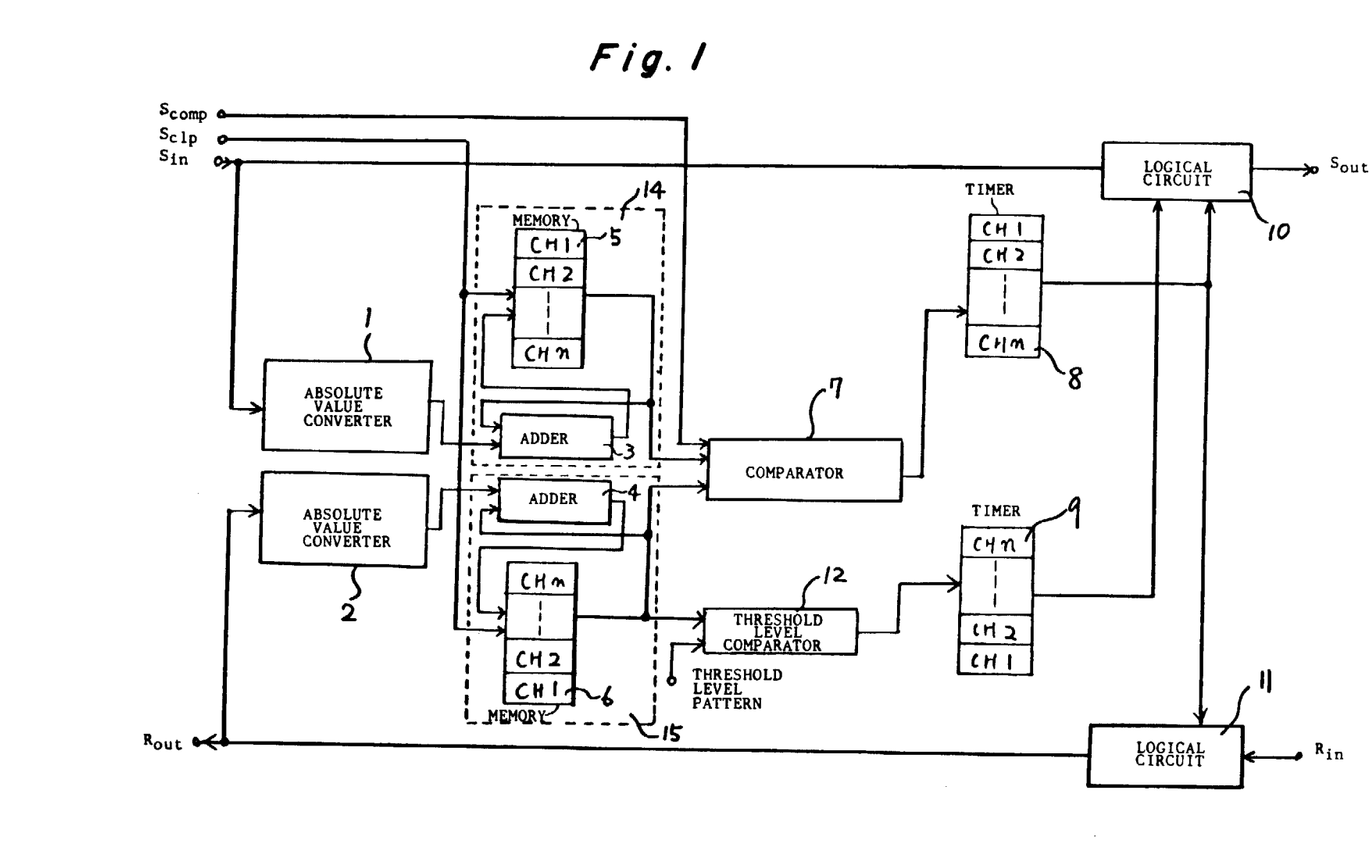
FIG. 1 is a block diagram of one preferred embodiment of a multiplex digital echo suppression system in accordance with the present invention.

In FIG. 1 there is shown a block diagram of a multiplex digital echo suppression system in accordance with the present invention including an absolute value converter 1 at the transmitting-side, another absolute value converter 2 on the receiving-side, and accumulators 14 and 15 consisting of adders 3 and 4 and memories 5 and 6, respectively, for accumulating, for each channel, the PCM signals transmitted to the receiving and transmitting-sides. The echo suppression system further includes a first timer 8 with a hangover time of the order of one hundred and a few tens micro seconds (ms), a second timer 9 with a hang-over time of the order of tens ms, a logic circuit 10 at the transmitting-side, a logic circuit 11 on the receiving-side, a threshold level comparator 12, an input terminal R$in$ at the receiving-side, an output terminal R$out$ at the receiving-side, an input terminal S$in$ on the transmitting-side, an output terminal S$out$ at the transmitting-side, a comparison pulse input terminal Scomp at the transmitting-side, and a clear pulse input terminal S$clp$ at the transmitting-side. The output terminal S$out$ and the input terminal R$in$ are coupled through a long-distance PCM transmission line to an input terminal at the receiving-side and an output terminal at the transmitting-side, respectively, of an echo compression system in a remote station. The output terminal R$out$ and the input terminal S$in$ are coupled to a PCM terminal equipment. In the memories 5 and 6 and the timers 8 and 9, CH$l$ through CH$n$ denote multiplex channels.

Figure 2:
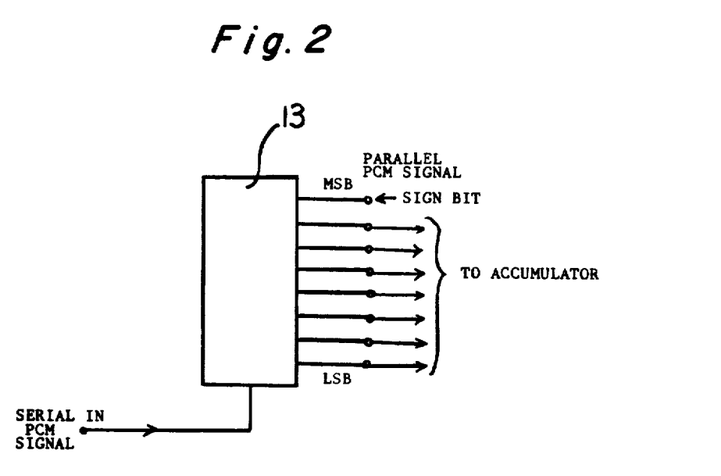
FIG. 2 is a block diagram of an absolute value converter.

In FIG. 2 there is shown the construction of the absolute value converter 1 or 2 consisting of a series-parallel converter 13 and parallel output terminals except a sign code terminal so that the series signal for each channel may be converted into the parallel signals and the output in which the sign code bit is removed from the parallel signals may be applied to the accumulator.

Figure 3:
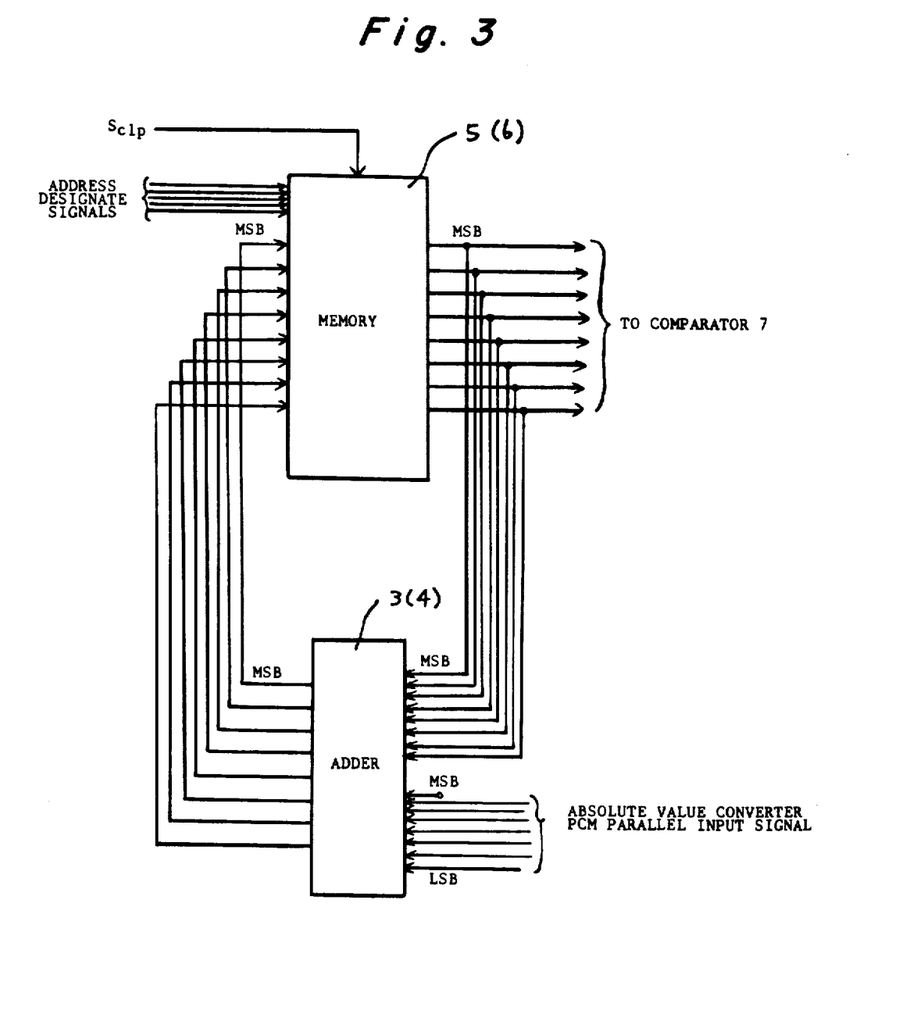
FIG. 3 is a block diagram of an accumulator.

FIG. 3 shows the construction of the accumulators each consisting of the adder 3 or 4 and the memory 5 or 6 which is a random access memory and whose content is initially zero. When a first parallel PCM signal from the absolute value converter 1 or 2 is applied to the adder 3 or 4, the output signal for each channel of the converter 1 or 2 is stored in the corresponding memory cell assigned for this channel in the memory 5 or 6. When the parallel PCM output signal in the next frame signal is applied to the adder 3 or 4, the content in the memory 5 or 6 is read out and added to the said parallel PCM signal. The sum of these signals is read out and stored again in the same channel of the memory 5 or 6. The above accumulation step is cycled for a predetermined time so that the absolute PCM signals from the converter 1 or 2 may be accumulated. After a predetermined time during which the absolute PCM signals have been accumulated, the signal accumulated for each channel in the memory 5 is read out in response to the comparison pulse S$comp$, and applied to the comparator 7. After the accumulated signal has been read out, the content in the memory cell is erased in response to the clear pulse S$clp$ so that the new PCM signal may be stored.

Figure 4:
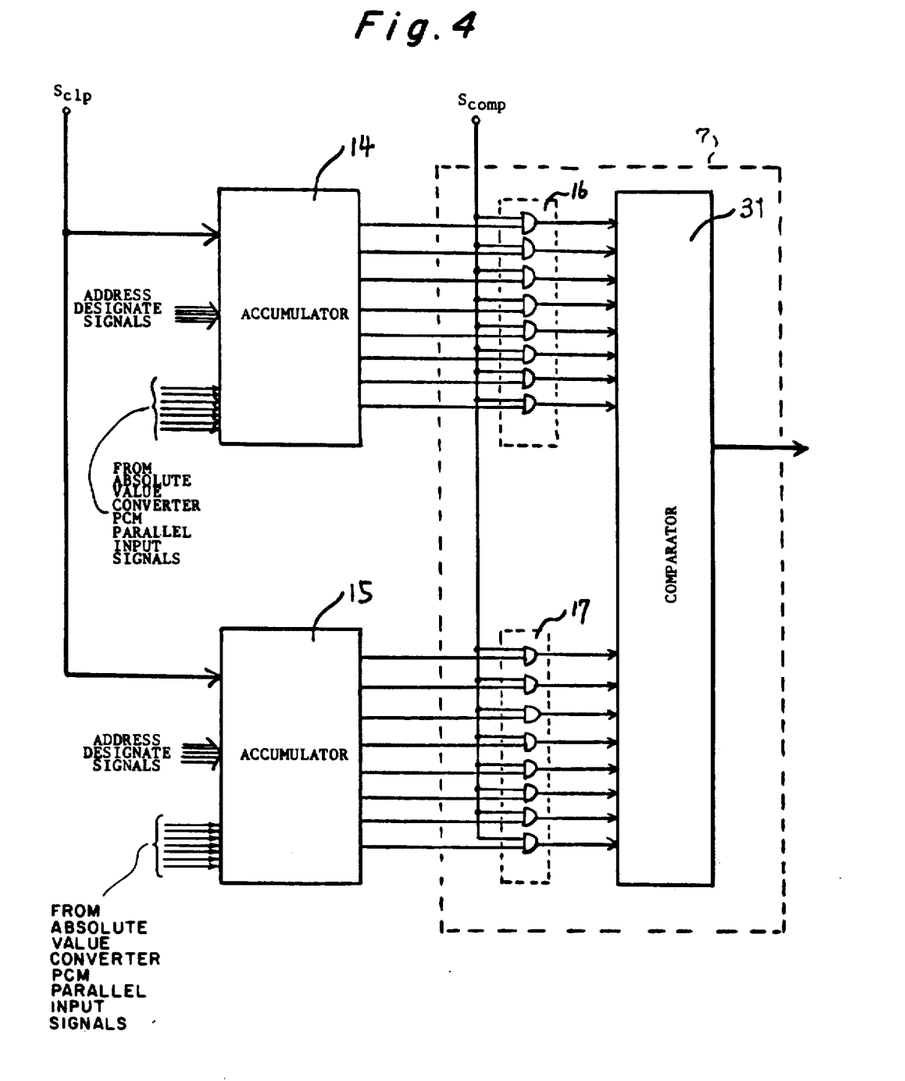
FIG. 4 is a block diagram of accumulators and a first comparator.

FIG. 4 shows the construction of the accumulator 14 on the transmitter side, the accumulator 5 at the receiving side and the first comparator 7 which consists of AND gate arrays 16 and 17 and the comparator 3. In order to compare the signal for one channel accumulated in the transmitting-side accumulator 14 with the signal for the same channel accumulated in the receiving-side accumulator 15, the address signal for the same channel is applied to the transmitting-side and receiving-side accumulators 14 and 15 simultaneously when the comparison pulse S$comp$ is applied to the AND gate arrays 16 and 17. Then, the accumulated signals for the same channel are transferred from the accumulators 14 and 15 through the AND gate arrays 16 and 17 into the comparator 3, and are compared with each other.

Figure 5:
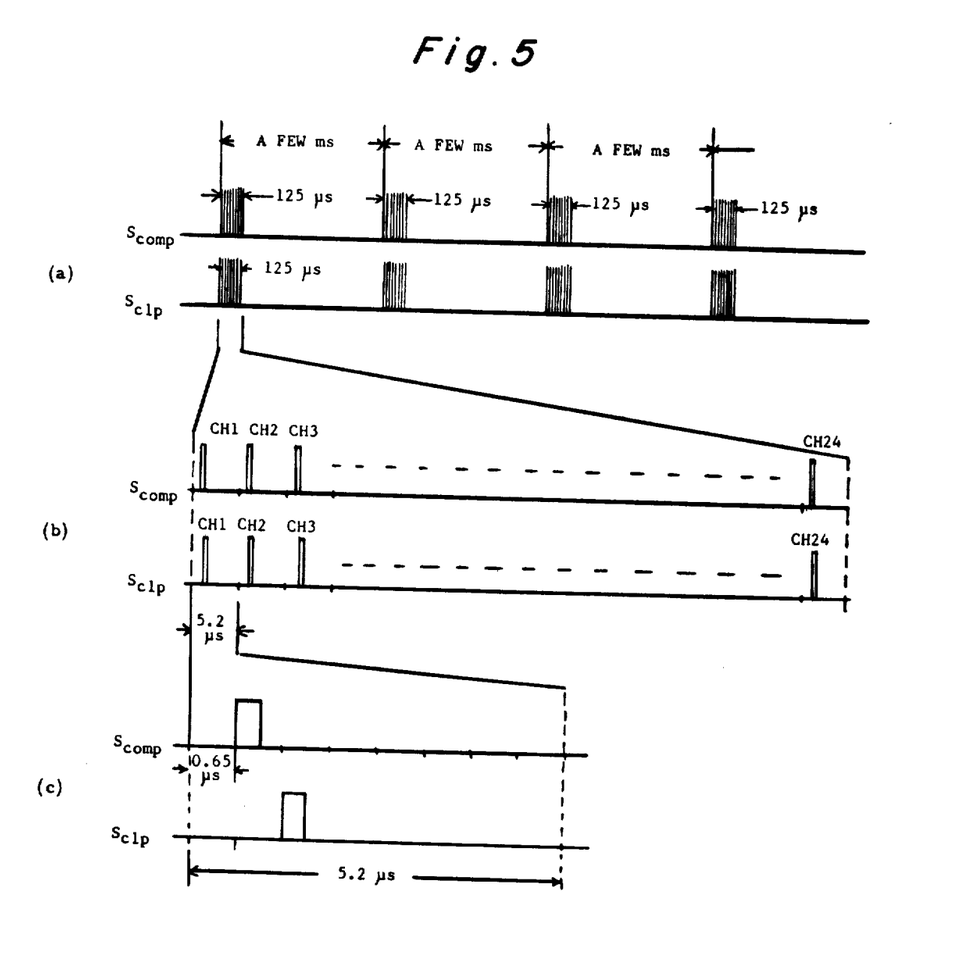
FIG. 5 shows the relationship between the comparison pulse and the clear pulse.

FIG. 5 shows the relation between the comparison pulse S$comp$ and the clear pulse S$clp$ when the PCM signals are transmitted through for instance 24 channels. As shown in FIG. 5(a), both the comparison pulses S$comp$ and the clear pulses S$clp$ are generated at the interval of a few ms, and as shown in FIG. 5(b) 24 comparison and clear pulses are generated for each frame period while one comparison pulse and one clear pulse are generated for each channel. And as shown in FIG. 5(c) in each channel the comparison pulse S$comp$ is generated, for example, at the second bit interval while the clear pulse S$clp$, at the third bit interval.

Figure 6:
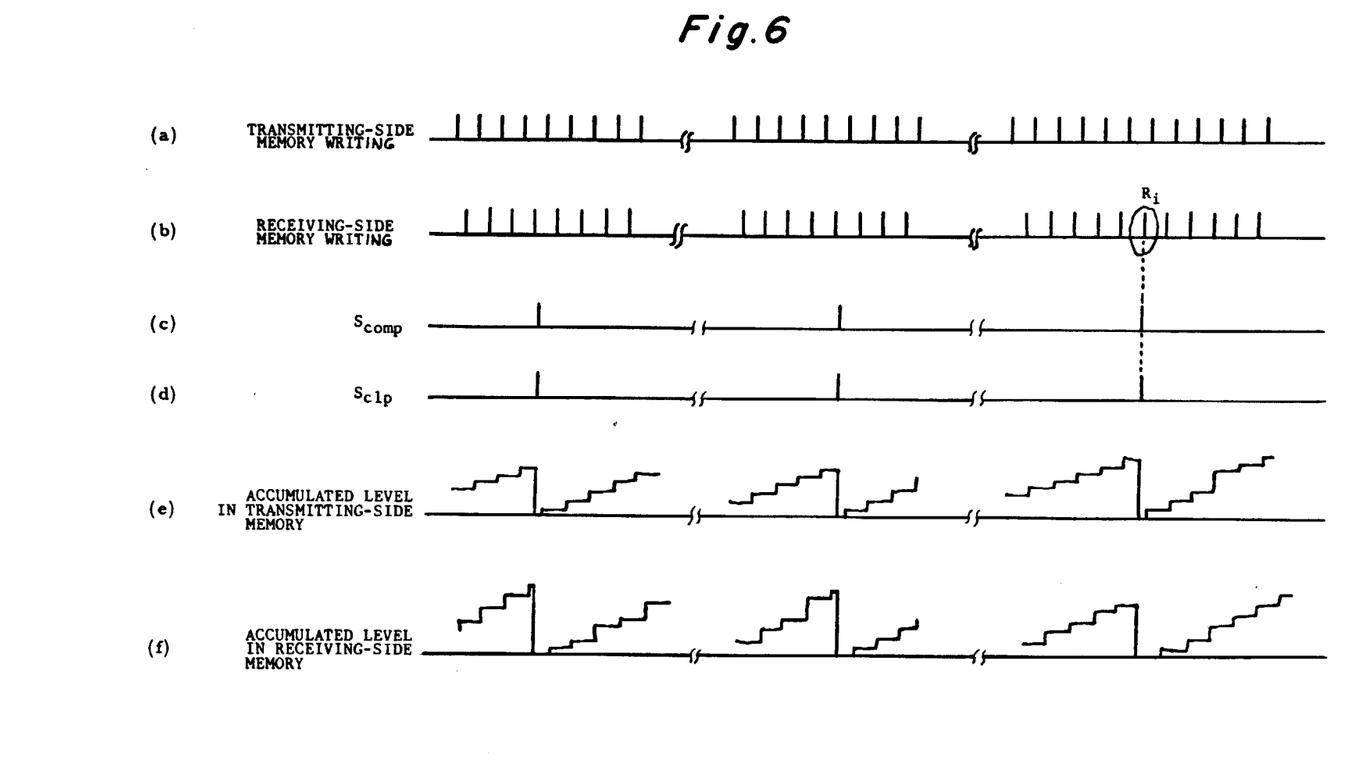
FIG. 6 is a timing chart used for the explanation of the mode of operation of the accumulators.

FIG. 6 shows the time relationship among the writing signal to be applied to the transmitter-side memory (See FIG. 6(a)), the writing signals to be applied to the receiving-side memory (See FIG. 6(b)), the comparison pulses S$comp$ (See FIG. 6(c)), the clear pulses S$clp$ (See FIG. 6(d)), the accumulated content in the transmitter-side memory (See FIG. 6(e)), and the accumulated content in the receiving-side memory (See FIG. 6(f)). In response to the transmitter-side and receiving-side writing signals, which are not synchronized (See FIGS. 6(a) and (b)), the outputs from the transmitting-side and receiving-side converters 1 and 2 are synchronously accumulated in the transmitting-side and receiving-side accumulators 14 and 15, respectively. In response to the comparison pulses S$comp$ (See FIG. 6(c)), the contents in both the accumulators 14 and 15 are simultaneously read out and transferred into the comparator 7, and in response to the clear pulse S$clp$, read-out contents in both the accumulators are erased in the manner described above so that the contents in both the accumulators become zero as shown in FIGS. 6(e) and (f).

Next the mode of operation when the writing and reading occur at the same time will be described. For instance when the output from the converter is to be stored in the receiving-side memory 6 in response to the receiving-side writing pulse R$i$ (See FIG. 6(b)), the comparison pulse S$comp$ is simultaneously applied to the memory 6. In this case, the priority is given to the reading in response to the comparison pulse S$comp$ rather than to the accumulation in response to the writing pulse R$i$. In other words, only the reading is carried out while the accumulation is skipped. While the comparison and clear pulses are generated at the interval of a few ms, the writing pulse is generated at the interval of 125 $\mu$s. Therefore even when the accumulated content is read out in response to the comparison pulse, and then erased in response to the clear pulse, the elimination of the accumulation of output signal will not adversely affect the over-all value of the accumulation.

As described above, the accumulated signals for the same channel are read out simultaneously from both the transmitting-side and receiving-side accumulators and transferred into the comparator 7 for comparison. The comparison 7 gives the output signal only when the accumulated signal read out from the transmitting-side memory 5 is higher in level than the accumulated signal read out from the receiving-side memory 6.

Figure 7:
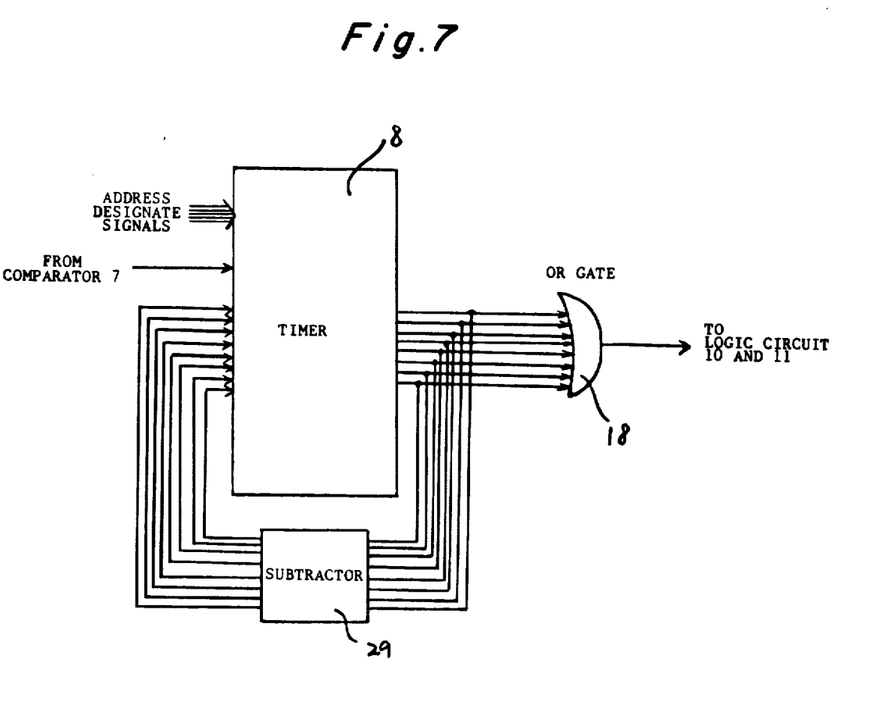
FIG. 7 is a block diagram of a first timer.
Figure 8:
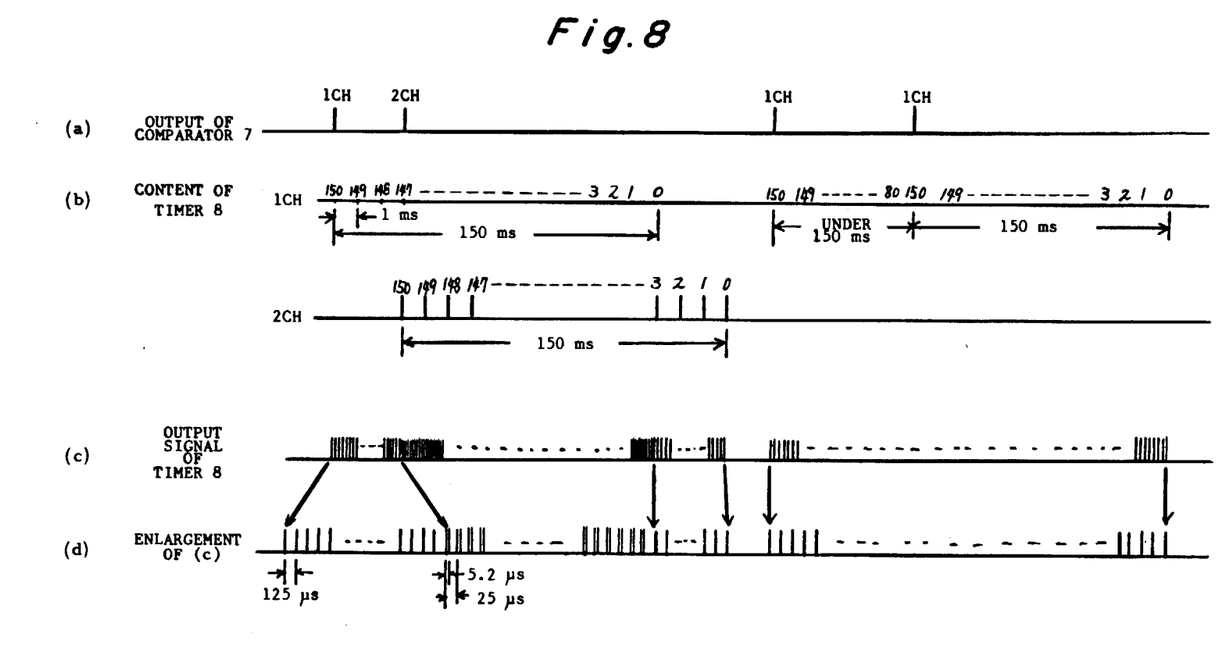
FIG. 8 is a timing chart used for the explanation of the relationship between the outputs from the first timer and the comparator.

As shown in FIG. 7, in response to the output signal fro the comparator 7 and the address signal, a specific channel, of the first timer 8 for instance channel 1 is selected and assigned with a predetermined hangover time, 150 ms in this embodiment. The 150 ms hangover time is subtracted one every 1 ms from the content 150 assigned to the channel 1 until the content becomes zero as shown in FIG. 8(b). During this hangover time, the output signal is derived from the timer 8 every 125 μs as shown in FIG. 8(c). Since the content becomes zero after 150 ms, the output from the timer 8 also becomes also zero. In like manner, in response to the output signal for the second channel from the comparator 7 (See FIG. 8(a)) and the address signal, the channel 2 in the timer 8 is selected and assigned with the 150 ms hangover time, and as long as the content in the channel 2 is greater than zero, the output pulse is derived from the timer 8 every 125 μs as shown in FIG. 8(c). FIG. 8(d) shows, one enlarged scale, the pulse trains shown in FIG. 8(c). During the predetermined hangover time, the output signal are derived from the timer 8 every 125 μs to each channel through an OR gate 18 (See FIG. 7). The hangover time writing signal and address signal which are applied to the timer 8 are synchronized with the transmitting-side PCM signal while the output signal from the timer 8 is read out in response to the reading signal and address signal synchronized with sending-side PCM signal and in response to the reading signal and address signal synchronized to the receiving-side PCM signal. When the transmitting-side and receiving-side PCM signals are in synchronism with each other, the timer 8 is so controlled that the content of the channel in synchronism with the transmittng-side PCM signal may be read out. When, as shown in FIGS. 8(a) and (b), the comparator 7 gives again the output signal to the timer 8 for the first channel before the predetermined hangover time assigned for the first channel in response to the former output signal for the first channel from the comparator 7, becomes zero, the hangover time of 150 ms is additionally assigned for the address of the first channel so that the output signal is derived from the timer 8 for additional 150 ms.

Figure 9:
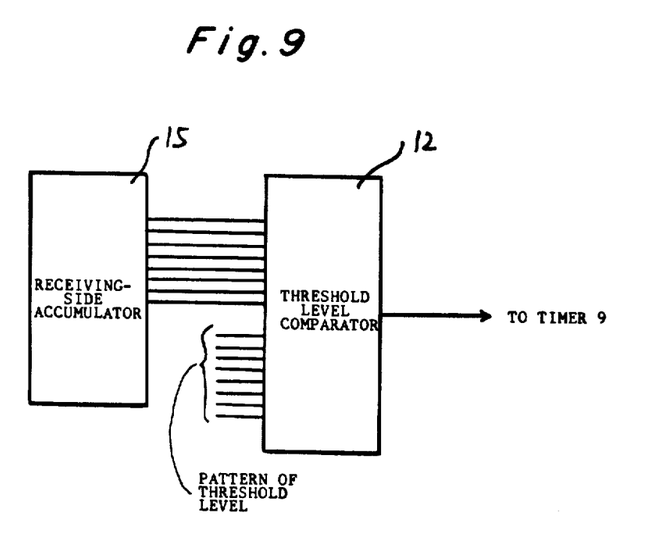
FIG. 9 is a block diagram of the receiving-side accumulator and a threshold level comparator.
Figure 10:
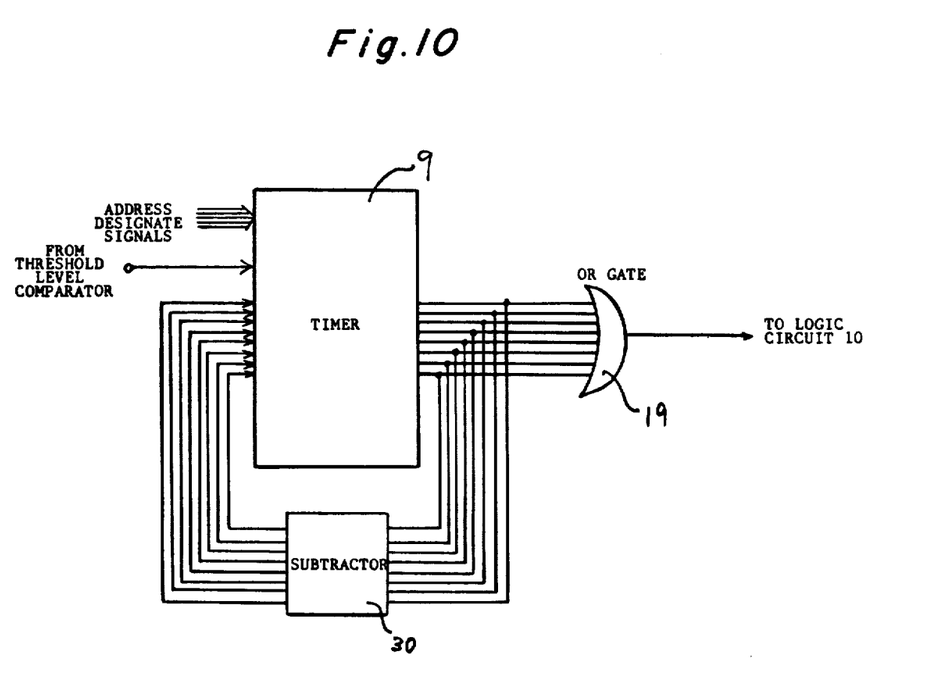
FIG. 10 is a block diagram of a second timer.

As shown in FIG. 9, the accumulated signals in the receiving-side accumulator 15 are read out for each channel and compared with the threshold level pattern in the threshold level comparator 12. The threshold level pattern in the form of a digital number is one of those in CCITT Recommendation G161, and is for instance −31 dBmo. When the accumulated signal in the receiving-side accumulator 15 is higher than the threshold level pattern, the threshold level comparator 12 gives the output signal. A predetermined hangover time (for instance 50 ms) is assigned to the channel in the timer 9 corresponding to the output signal from the comparator 12. The hangover time 50 ms is held by subtracting in a subtractor 30 one every 0.5 ms from the content of the channel of the timer 9 for which this hangover time is assigned. During this time, the content of the channel for which this hangover time is assigned is not 0, but a bit of 1s is included in some bits of this channel so that every time when the signal is derived every 125 μs to this channel, the content of the channel is transferred every 125 μs through an OR gate 19 to the logic circuit 10. The writing signal and address signal which are applied to the timer 9 are synchronized with the receiving-side PCM signal, on the other hand, the output signal is derived from the timer 9 in response to the reading signal and address signal in synchronism with the transmitting-side PCM signal. When the output signal from the comparator 12 is applied to the timer 9 before the content thereof becomes zero, the additional hangover time is assigned again, and the output signal is derived from the timer 9 to the logic circuit 10 through an OR gate 19 until the content in the timer 9 becomes zero.

Figure 11:
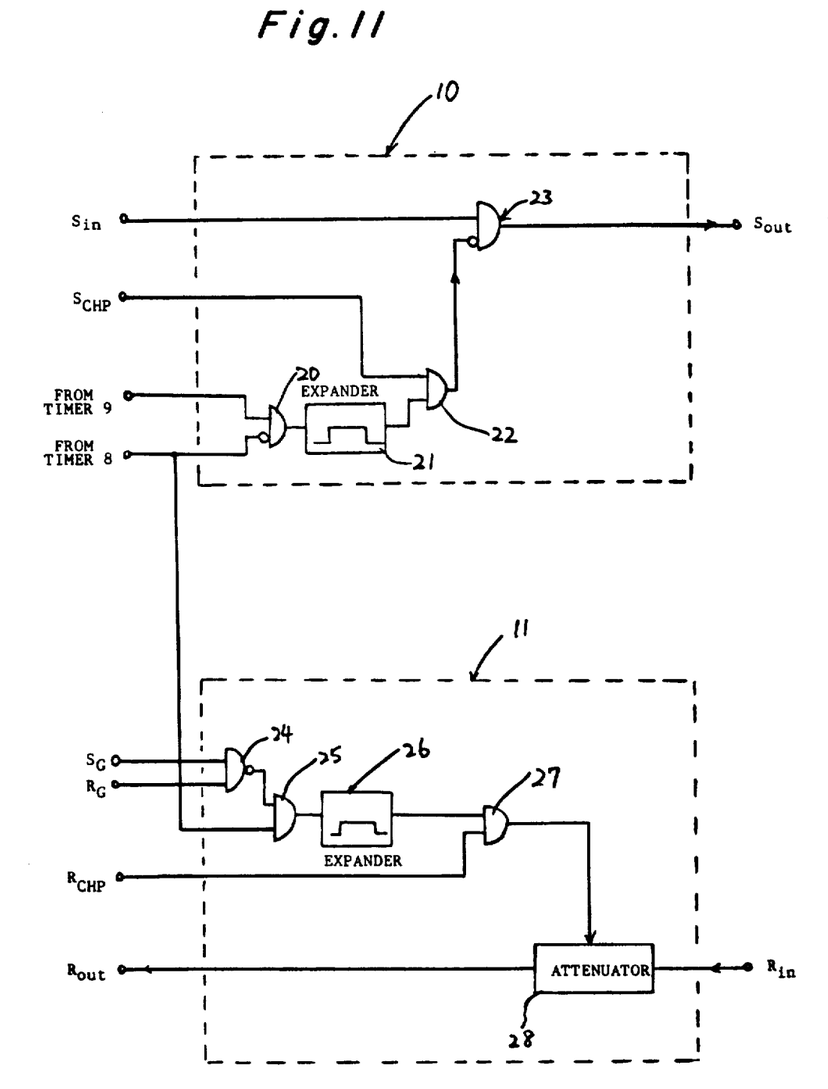
FIG. 11 is a block diagram of a transmitting- and receiving-side logic circuits.
Figure 12:
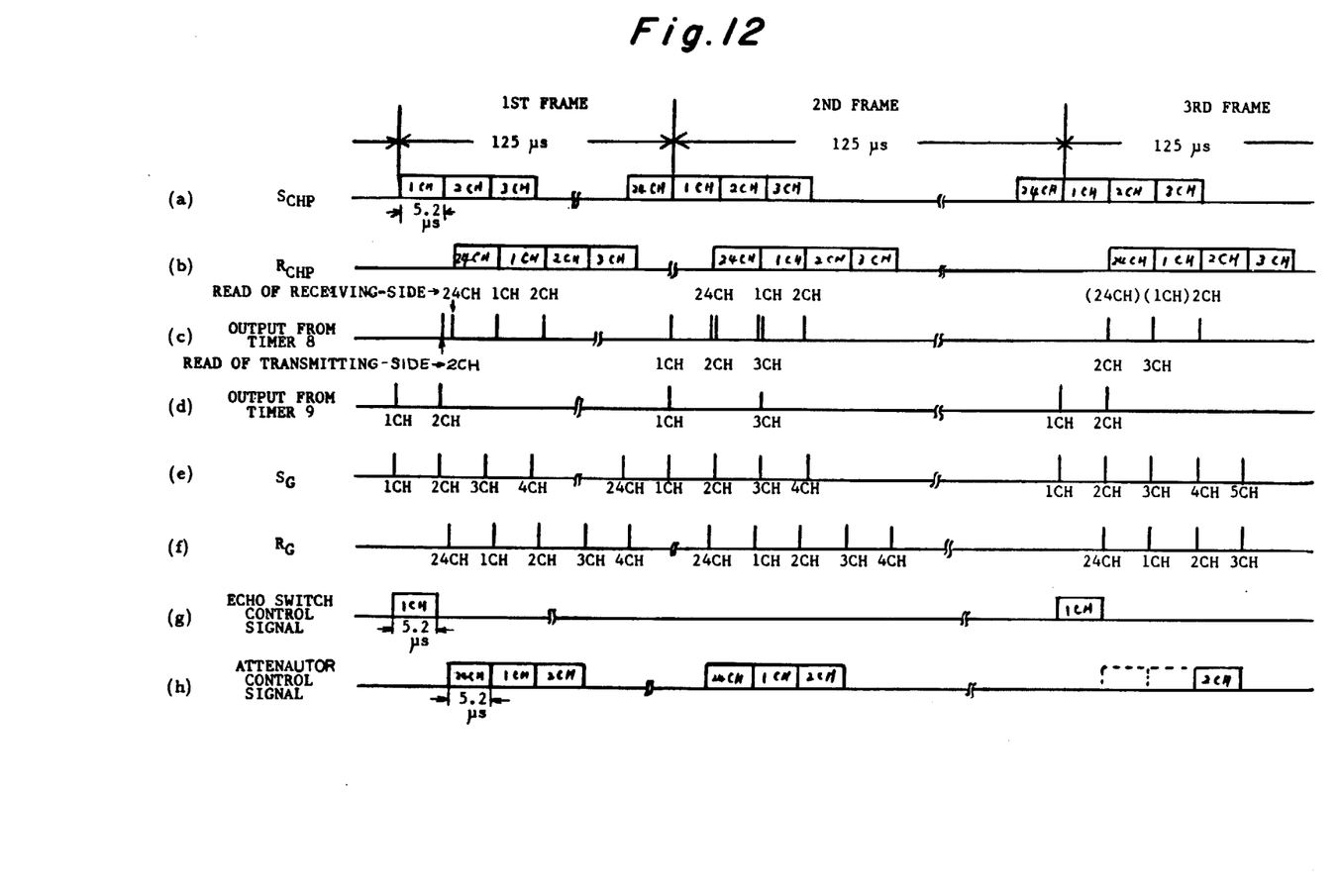
FIG. 12 is a timing chart used for the explanation of the mode of operation of the logic circuits shown in FIG. 11 in response to the outputs from the comparators shown in FIGS. 4 and 9.

In FIG. 11 there are shown the circuit diagrams of the logic circuits 10 and 11. The output signal which is read out of the timer 8 in synchronism with the transmitting-side PCM signal is applied to a gate 20 in the logic circuit 10 while the signal read out from the timer 8 in synchronism with the receiving-side PCM signal is applied to a gate 25 in the logic circuit 11. The output signal read out from the timer 9 in synchronism with the transmitting-side PCM signal is applied to the gate 20 in the logic circuit 10. The gate 20 gives no output signal even if the output from the timer 9 is applied thereto as long as the output from the timer 8 is applied thereto. In other words, when the transmitting-side PCM signal is greater than the receiving-side PCM signal, the timer 8 gives the output signal. In this case, the echo control signal is not transmitted from the gate 22 to an echo switch 23, so that the transmitting-side PCM signal applied to the input terminal Sin may pass through the echo switch 23. When only the output signal from the timer 9 is applied to the gate 20 while the timer 8 gives no output signal, it passes through the gate 20, and is expanded in synchronism with the transmitting-side channel pulse $S_{CHP}$ (See FIG. 12(a)) in an expander 21. That is, the output signal from the timer 9 is converted into a pulse with a pulse duration equal to the channel width. The output pulse signal from the expander 21 is applied to a gate 22 to which the channel pulse $S_{CHP}$ is also applied so that the echo switch control signal is generated. In response to the echo-switch control signal, the echo switch 23 is turned off so that the PCM signal applied to the input terminal Sin cannot pass through the echo-switch 23. The above output signal from the timer 9 is derived when the transmitting-side PCM signal is smaller than the receiving-side PCM signal which is greater than the threshold level pattern in the comparator 12.

The output signal read out of the timer 8 in synchronism with the receiving-side PCM signal is applied to a gate 25 in the logic circuit 11. However, as described elsewhere, when the reading signal in synchronism with the transmitting-side PCM signal is derived simultaneously with the reading signal in synchronism with the receiving-side PCM signal, the transmitting-side gate signal $S_G$ (See FIG. 12(e)) which is generated by the PCM equipment (not shown) immediately before the channel pulse $S_{CHP}$ (See FIG. 12(a)) is derived simultaneously with the receiving-side gate signal $R_G$ (See FIG. 12(f)) generated by the PCM equipment immediately before the channel pulse $R_{CHP}$ (See FIG. 12(b)). Therefore both the gate signals $S_G$ and $R_G$ applied simultaneously to a gate 24 so that the output signal from the timer 8 is inhibited from passing through the gate 25. On the other hand, when the reading signal in synchronism with the transmitting-side PCM signal is not derived simultaneously with the reading signal in synchronism with the receiving-side PCM signal, the output from the timer 8 passes through the gate 25, and is expanded in synchronism with the channel pulse $R_{CHP}$ (See FIG. 12(b)) for the receiving-side PCM signal in an expander 26. That is, the output signal from the timer 8 is converted into a pulse with the pulse duration equal to that of the channel pulse $R_{CHP}$. The output from the expander 26 is applied to a gate 27 to which the channel pulse $R_{CHP}$ is also applied so that an attenuator control signal may be generated from the gate 27. More particularly, the output signal is derived from the timer 8 only when the level of the transmitting-side PCM signal is higher than that of the receiving-side PCM signal. Therefore the attenuator control signal from the gate 27 generated in response to the output from the timer 8 applied to the gate 25 activates an attenuator 28 so that the receiving-side PCM signal may be attenuated.

FIG. 12 shows the time relationship among the signals generated in the logic circuits 10 and 11. FIG. 12(a) shows the transmitting-side channel pulses $S_{CHP}$; FIG. 12(b), the receiving-side channel pulses $R_{CHP}$; FIG. 12(c), the output signals from the timer 8; FIG. 12(d), the output signals from the timer 9; FIG. 12(e), the transmitting-side gate signal $S_G$; FIG. 12(f), the receiving-side gate signal $R_G$; FIG. 12(g), the echo-switch control signals; and FIG. 12(h), the attenuator control signals.

The echo-switch control signal is derived in synchronism with the transmitting-side channel pulse when no output signal is derived from the timer 8 in synchronism with the transmitting-side PCM signal while the output signal is derived from the timer 9 in synchronism with the transmitting-side PCM signal. The attenuator control signal is derived when the output signal is derived from the timer 8 in synchronism with the receiving-side PCM signal. However, no attenuator control signal is derived when, as shown in FIGS. 12(e) and 12(f), the transmitting-side gate signal $S_G$ coincides with the receiving-side gate signal $R_G$; that is, when the transmitting-side PCM signal coincides with the receiving-side PCM signal.

Next, the operation modes of the echo suppression system with the above construction will be described in more detail hereinafter. The operation modes are divided into five modes according to the existence of the speech signal in the sending side and/or receiving-side paths.

First mode, in which the speech signal appears only at the receiving-side input terminal R$in$:

In this mode, when the attenuator 28 in the logic circuit 11 is not activated, the receiving-side PCM speech signal passes to the PCM terminal equipment through the output terminal Rout and to the absolute value converter 2. In the absolute value converter 2, the PCM signal is converted into the parallel signal; and into the absolute signal by being eliminated in the sign bit, and is accumulated in the accumulator 15. The accumulated signal is compared in the comparator 7 with the signal accumulated in the transmitting-side accumulator 14. However, since no transmitting-side communication signal appears, no output signal is derived from the comparator 7 so that the timer 8 is not set. Meanwhile the output from the receiving-side accumulator 15 is compared in the threshold level comparator 12 with the threshold level pattern of the type described elsewhere. In this mode, the output from the accumulator 15 is in excess of the pattern so that the timer 9 is set to the predetermined hangover time. In response to the output signal derived from the timer 9 during this hangover time, the echo switch 23 in the logic circuit 10 is turned off so that the speech signal interfered with echo to be transmitted through the output terminal Sout may be blocked.

Since the timer 8 is not set, no attenuator control signal is applied to the atenuator 28 in the receiving-side logic circuit 11 so that the speech signal passing through the attenuator 28 is not attenuated.

As described above, when the communication signal appears only on the receiving-side, no communication signal is derived from the transmitting-side output terminal Sout so that the echo may be completely suppressed even when the receiving-side speech signal appears at the transmitting-side input terminal because of the mismatch in the transmission line.

Second Mode, in which the speech signal eliminated sign bit appears only at the transmitting-side input terminal S$in$:

The transmitting-side PCM signal is converted into the parallel PCM signal in the transmitting-side absolute value converter 1, and is accumulated in the transmitting-side accumulator 14. Since no speech signal appears on the receiving-side, the output signal is derived from the comparator 7, and is applied to the timer 8 so that the first hangover time may be set. During this first hangover time the output signal is derived from the timer 8, but no output signal is derived from the timer 9. The output signal derived from the timer 8 in synchronism with the transmitting-side PCM signal is applied to the gate 20 so that the echo switch 23 may be closed and the speech signal may be terminated. The output signal derived from the timer 8 in synchronism with the receiving-side PCM signal passes through the gate 25, and is expanded in the expander 26, and is applied to the attenuator 28 so that the attenuator 28 may be activated to attenuate the receiving-side speech signal.

Third Mode, in which the transmitting-side speech signal appears when the receiving-side speech signal is present:

In the initial condition, the echo switch 23 is turned off as described in conjunction with the First Mode the transmission side speech-signal cannot pass through since the echo switch 23 while the receiving-side speech signal passes through the attenuator 28 without being attenuated in the logic circuit 11. Under this condition, when the transmitting-side speech signal appears and may be higher in level than the receiving-side communication signal, the output signal is derived from the comparator 7, and is applied to the timer 8 so that the hangover time may be set. The output signal derived from the timer 8 in synchronism with the transmitting-side PCM signal is applied to the gate 20 so that the echo switch 23 may be turned off and the speech signal may be transmitted. On the other hand, the output signal derived from the timer 8 in synchronism with the receiving-side PCM signal may be applied to the gate 25 in the logic circuit 11 so that the attenuator 28 is activated to attenuate the receiving-side speech signal. In the third mode, the echo is not completely suppressed, but the satisfactory attenuation may be attained.

Next, when the level of the incoming transmitting-side speech signal is lower than that of the receiving-side speech signal, the output derived from the accumulator 14 is lower than the value accumulated in the accumulator 15, and no output signal is derived from the comparator 7 so that the timer 8 is not set. As a result, as the same with the First Mode, the receiving-side speech signal passes through the attenuator 28 without being attenuated while the echo switch 23 in the logic circuit 10 is turned off so that no speech signal is transmitted through the transmitting-side output terminal Sout. Thus the echo can be completely suppressed.

Fourth Mode, in which the receiving-side signal appears when the transmitting-side communication signal is present:

The initial condition is same with regard to the existence of Second Mode with only the transmitting-side speech signal. Under this condition, the echo switch 23 in the logic circuit 10 is being turned on so that the transmitting-side speech signal may be transmitted through the transmitting-side output terminal S$_{out}$. On the other hand, the receiving-side speech signal is being attenuated by the attenuator 28 in the receiving-side logic circuit 11. When the receiving-side speech signal appears and is higher in level than the transmitting-side speech signal under the above condition, as the output derived from the accumulator 15 is higher than the level pattern of the threshold level comparator 12 so that the timer 9 is set to the predetermined second hangover time and consequently during this second hangover time the output signal is derived from the timer 9. However, at this moment the output signal is still kept being derived from the timer 8 so that the passage through the gate 20 of the output signal from the timer 9 is prevented. As a result, the echo switch 23 is kept turned on.

But, when the next comparison pulse is applied the output derived from the accumulator 15 is higher in level than the output signal derived from the accumulator 14 so that the output signal is not derived from the comparator 7 and is not applied to the timer 8. As a result, the timer 8 is not set so that the output signal from the timer 9 passes through the gate 20 and the echo switch 23 is turned off. Since no output signal is derived from the timer 8, the attenuator 28 in the logic circuit 11 is not activated. This condition is the same with First Mode, and since the echo switch 23 is turned off, the complete echo suppression may be attained.

Next, when the receiving-side speech signal appears and is lower in level than the transmitting-side speech signal, as the output from the accumulator 15 is higher than the level pattern in the comparator 12 so that the hangover time of the timer 9 is set. However, the output signal is also derived from the timer 8 so that the echo switch 23 remains turned on while the attenuator 28 is activated. This condition is same with Second Mode.

Fifth Mode, in which neither of the transmitting-side and receiving-side speech signals are present:

Since the outputs from both the accumulators 14 and 15 are zero, no output signal is derived from the comparator 7. In addition, no output signal is derived from the threshold level comparator 12. As a result, neither the timer 8 nor 9 is set so that the echo switch 23 is turned on while the attenuator 28 is not activated. That is, in Fifth Mode the accumulators in both the transmitting and receiving sides are waiting for the speech signal.

What is claimed is:

1. A multiplex digital echo suppression system comprising
    a. a transmitter-side absolute value converter for converting the transmitting-side PCM signal for each channel into a parallel PCM signal with the sign bit eliminated and representing the absolute value of the transmitting-side PCM signal,
    b. a receiving-side absolute value converter for converting the receiving-side PCM signal for each channel into a parallel PCM signal with the sign bit eliminated and representing the absolute value of the receiving-side PCM signal,
    c. a transmitting-side accumulator and a receiving-side accumulator each for accumulating the output signal from the corresponding absolute value converter for a predetermined time,
    d. first comparator means for comparing the output signal of each channel derived from said transmitting-side accumulator in synchronism with the transmitting-side PCM signal with the output signal for the corresponding channel derived from said receiving-side accumulator in synchronism with the receiving-side PCM signal and for generating the output signal when the output from said transmitting-side accumulator is higher than the output from said receiving-side accumulator,
    e. first timer means which is set for a first predetermined time in response to the output signal from said first comparator means and continuously generates an output signal during said first predetermined time,
    f. second threshold lever comparator means for comparing a predetermined threshold leverl with the output for each channel derived from said receiving-side accumulator and for generating an output signal when the output from said receiving-side accumulator is higher than said predetermined threshold level,
    g. second timer means which is set for a second predetermined time shorter than said first predetermined time in response to the output signal from said second comparator means and continuously generates an output signal during said second predetermined time,
    h. receiving-side logic circuit means including attenuator means for attenuating the receiving-side input PCM signal in said certain channel in response to the output for said certain channel from said first timer means, and
    i. transmitting-side logic circuit means including echo switching means for opening and closing said echo switching means for said certain channel in response to a logical combination of the outputs for said certain channel from said first and second timer means.

2. A multiplex digital echo suppression system as set forth in claim 1 wherein each of said transmitting-side and receiving-side accumulators comprises
    a memory and
    an adder.

3. A multiplex digital echo suppression system as set forth in claim 2 wherein said memory, and said first and second timer means are of the random access memory type.

4. A multiplex digital echo suppression system as set forth in claim 1 wherein said transmitting-side logic circuit means comprises
    a. logic gate means for producing an output signal in response to an output signal from said first timer means,
    b. expander circuit means connected to said logic gate means for expanding the pulse duration of the output from said logic gate means to that of the channel pulse, and
    c. said echo switching means connected to said expander circuit means for suppressing the transmitting-side PCM signal in the channel corresponding to the output from said expander circuit means in response thereto.

5. A multiplex digital echo suppression system as set forth in claim 1 wherein said receiving-side logic circuit means comprises
    a. logic gate means for preventing the passage therethrough of the output from said first timer means in response to the synchronous occurrence of said output with both the transmitting-side and receiving-side read signals, and for passing said output signal from said first timer means in response to the non-synchronous occurrence of said output signal with said transmitting-side and receiving-side read signals, b. expander circuit means for expanding the pulse duration of the output signal from said logic gate means to that of the channel pulse, and c. said attenuator means attenuates, the receiving-side PCM signal for the channel corresponding to said output signal from said expander circuit means.

* * * * *